United States Patent
Kung et al.

(10) Patent No.: US 10,532,426 B2
(45) Date of Patent: Jan. 14, 2020

(54) LASER MACHINING HEAD AND ORIGIN CALIBRATION METHOD FOR SAME

(71) Applicant: Panasonic Intellectual Property Management Co., Ltd., Osaka (JP)

(72) Inventors: Yiheng Kung, Osaka (JP); Wataru Takahashi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 288 days.

(21) Appl. No.: 15/580,434

(22) PCT Filed: Aug. 29, 2016

(86) PCT No.: PCT/JP2016/003920
§ 371 (c)(1),
(2) Date: Dec. 7, 2017

(87) PCT Pub. No.: WO2017/043042
PCT Pub. Date: Mar. 16, 2017

(65) Prior Publication Data
US 2018/0161922 A1     Jun. 14, 2018

(30) Foreign Application Priority Data
Sep. 8, 2015 (JP) ................. 2015-176224

(51) Int. Cl.
*B23K 26/064* (2014.01)
*B23K 26/08* (2014.01)
(Continued)

(52) U.S. Cl.
CPC .......... *B23K 26/064* (2015.10); *B23K 26/046* (2013.01); *B23K 26/0648* (2013.01);
(Continued)

(58) Field of Classification Search
CPC ............. B23K 26/064; B23K 26/0884; B23K 26/0648; B23K 26/082; B23K 26/0652;
(Continued)

(56) References Cited

U.S. PATENT DOCUMENTS 5,001,324 A * 3/1991 Aiello .................... B23K 26/04
                                                    219/121.63
5,374,804 A * 12/1994 Uchino .................. B23K 26/10
                                                    219/121.78
(Continued)

FOREIGN PATENT DOCUMENTS

JP     2004-093926     3/2004
JP     2005-128162     5/2005
(Continued)

OTHER PUBLICATIONS

International Search Report of PCT application No. PCT/JP2016/003920 dated Oct. 18, 2016.

*Primary Examiner* — David J Walczak
(74) *Attorney, Agent, or Firm* — Wenderoth, Lind & Ponack, L.L.P.

(57) ABSTRACT

A laser machining head controls an irradiation position of a laser beam on a machining target by rotating a first parallel plate by a first motor and rotating a second parallel plate by a second motor. A first holder holding the first parallel plate has a first rotation angle identification unit, and a second holder holding the second parallel plate has a second rotation angle identification unit. The first rotation angle identification unit has a positioning surface that allows positioning relative to the first parallel plate, and the second rotation angle identification unit has a positioning surface that allows positioning relative to the second parallel plate.

4 Claims, 9 Drawing Sheets

(51) Int. Cl.
*B23K 26/06* (2014.01)
*B23K 26/082* (2014.01)
*B23K 26/21* (2014.01)
*B23K 26/70* (2014.01)
*B23K 26/046* (2014.01)
*G02B 26/08* (2006.01)
*G02B 26/10* (2006.01)

(52) U.S. Cl.
CPC ........ *B23K 26/0652* (2013.01); *B23K 26/08* (2013.01); *B23K 26/082* (2015.10); *B23K 26/0884* (2013.01); *B23K 26/21* (2015.10); *B23K 26/706* (2015.10); *G02B 26/08* (2013.01); *G02B 26/0875* (2013.01); *G02B 26/101* (2013.01)

(58) Field of Classification Search
CPC ...... B23K 26/08; B23K 26/21; B23K 26/706; B23K 26/046; G02B 26/08; G02B 26/0875; G02B 26/101
USPC .............. 219/121.6, 121.61, 121.62, 121.64, 219/121.67, 121.68, 121.69, 121.74, 219/121.75, 121.78, 121.79
See application file for complete search history.

(56) References Cited

U.S. PATENT DOCUMENTS

| 6,064,033 | A * | 5/2000 | Carbonato | B23K 26/0884 |
| | | | | 219/121.67 |
| 8,450,642 | B2 * | 5/2013 | Cardinale | B23K 26/0884 |
| | | | | 219/121.78 |
| 2017/0050267 | A1 | 2/2017 | Kung et al. | |

FOREIGN PATENT DOCUMENTS

| JP | 5178315 B | 4/2013 |
| WO | 2015/129249 | 9/2015 |

* cited by examiner

LASER MACHINING HEAD AND ORIGIN CALIBRATION METHOD FOR SAME

This application is a U.S. national stage application of the PCT International Application No. PCT/JP2016/003920 filed on Aug. 29, 2016, which claims the benefit of foreign priority of Japanese patent application No. 2015-176224 filed on Sep. 8, 2015, the contents all of which are incorporated herein by reference.

TECHNICAL FIELD

The present disclosure relates to a laser machining head usable in a remote laser machining in which a machining point is irradiated with a laser beam from a position away from the machining point to perform welding or the like, and also relates to an origin calibration method for the laser machining head.

BACKGROUND ART

In recent years, it has become possible to use an emission optical system with a long focal length, and a machining method called a remote laser machining is attracting attention, in which a machining point is irradiated with a laser beam from a position away from the machining point to perform welding or the like (see PTL 1, for example).

CITATION LIST

Patent Literature

PTL 1: Japanese Patent No. 5,178,315

SUMMARY OF THE INVENTION

According to the present disclosure, there is provided a laser machining head configured to control an irradiation position of a laser beam on a machining target, the laser machining head including: a first parallel plate configured to shift the laser beam incident on the first parallel plate; a first holder holding the first parallel plate and having a first rotation angle identification unit; a first motor configured to rotate the first holder around a first rotary axis; a second parallel plate configured to shift the laser beam that has been shifted by the first parallel plate; a second holder holding the second parallel plate and having a second rotation angle identification unit; and a second motor configured to rotate the second holder around a second rotary axis, wherein the first parallel plate and the second parallel plate are disposed such that the first rotary axis and the second rotary axis extend in an identical direction, the first motor rotates the first parallel plate and the second motor rotates the second parallel plate to control an irradiation position of the laser beam on the machining target, the first rotation angle identification unit has a positioning surface that allows positioning relative to the first parallel plate, and the second rotation angle identification unit has a positioning surface that allows positioning relative to the second parallel plate.

According to the present disclosure, there is provided an origin calibration method for the above laser machining head, wherein an origin adjusting hole is formed on an outer wall of the laser machining head, a positioning surface of a rotation angle identification unit of the first holder and a positioning surface of a rotation angle identification unit of the second holder are simultaneously aligned by inserting an origin adjusting jig in the origin adjusting hole, the method including: inserting the origin adjusting jig from the outer wall of the laser machining head; and simultaneously calibrating an origin of the first parallel plate and an origin of the second parallel plate.

DESCRIPTION OF EMBODIMENT

Prior to describing an exemplary embodiment, problems in a conventional origin calibration method for an optical machining head will be briefly described.

An optical machining head such as a laser machining head determines an irradiation position of light by operating optical elements such as a lens or a mirror. Accordingly, the irradiation position of light may be largely deviated in a case where positions of optical elements are shifted even in small amounts, and accuracy of the positions of the optical elements has a great influence on machining quality.

Such an optical machining head is driven by a servomotor in most cases, and data relative to a rotation origin of the servomotor is stored using a battery. In case of a malfunction in a battery, a harness connecting the battery and a motor, or the motor itself, for example, positions of the optical elements need calibration.

Figure 10:
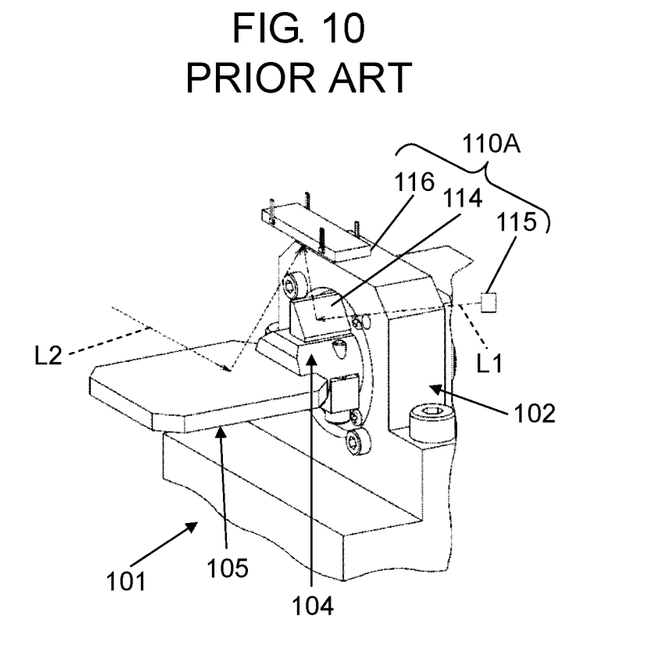
FIG. 10 illustrates a configuration of an origin of a conventional laser irradiation position.

A conventional origin calibration method is described below with reference to FIG. 10. According to the conventional origin calibration method, sensor 110A configured to read a detection laser beam is provided to record in advance the irradiation intensity with which detection laser beam L2 irradiates sensor 110A when optical element 105 is disposed at a specific position. At the time of origin calibration, optical element 105 is moved to the specific position, and irradiation intensity of detection laser beam L2 at the moment is compared with the previous irradiation intensity to determine whether optical element 105 is shifted. In the case where optical element 105 is determined to be shifted, the irradiation intensity of emitted detection laser beam L2 is read, and an amount of displacement of optical element 105 is calculated backward with a specific algorithm to correct the positional deviation of optical element 105 (see PTL 1).

However, according to the above conventional origin calibration method for an optical machining head, an optical machining head such as a laser machining head determines an irradiation position of light by operating optical element 105 such as a lens or a mirror. The irradiation position of detection laser beam L2 may be largely deviated in a case where a position of optical element 105 is shifted even in small amounts. Therefore, accuracy of the position of optical element 105 has a great influence on machining quality.

Exemplary Embodiment

Hereinafter, a basic idea of an exemplary embodiment of the present disclosure will be described first, and then a detail thereof will be described with reference to the drawings.

Laser machining head 41 according to the present exemplary embodiment has a laser-beam LB shifting function to shift a focusing position of laser beam LB condensing at a nozzle tip, and is disposed on an optical path of laser beam LB.

Figure 1:
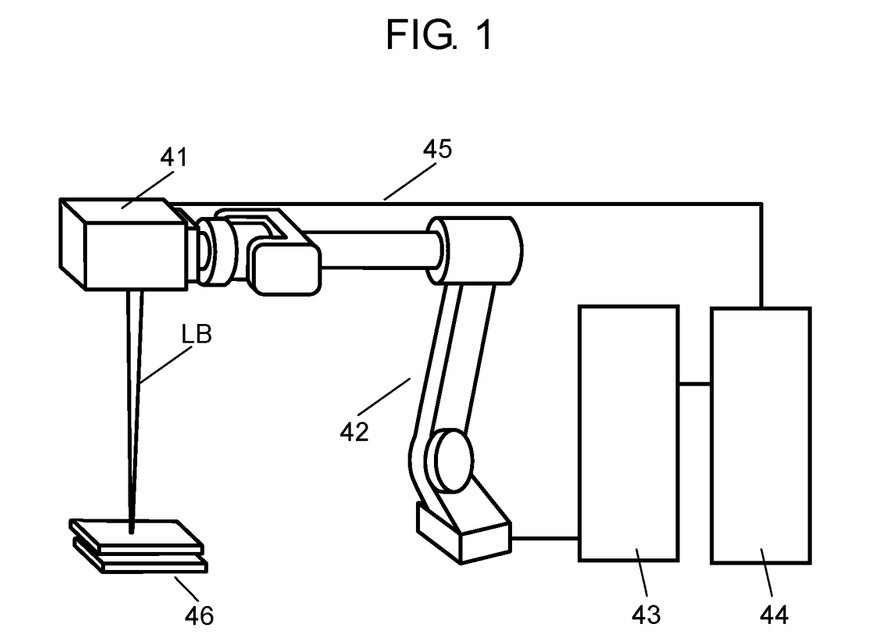
FIG. 1 shows a schematic configuration of a laser machining system according to an exemplary embodiment.
Figure 2:
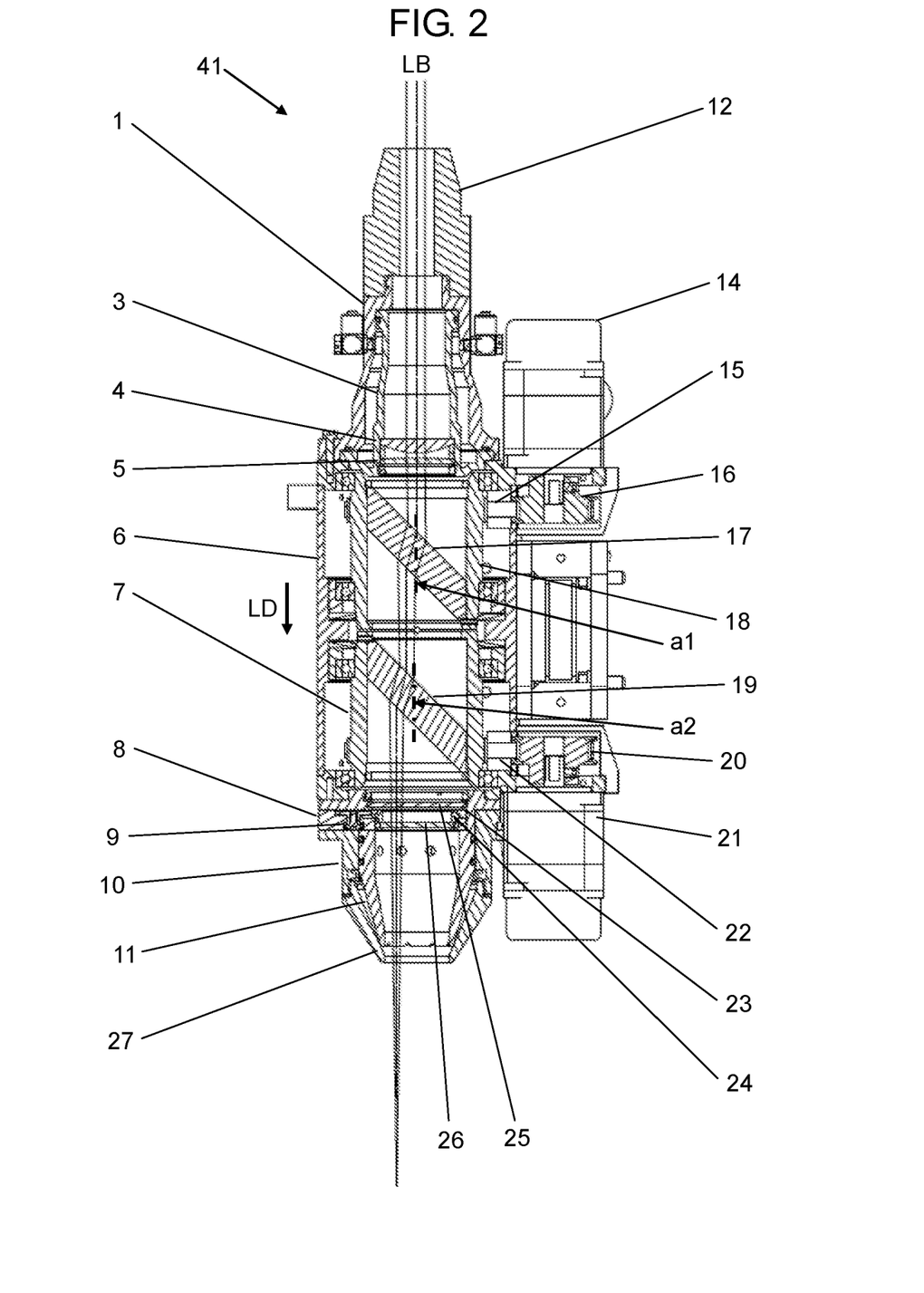
FIG. 2 shows a schematic configuration of a laser machining head according to the exemplary embodiment.

Specifically, as shown in FIG. 1 or 2, laser machining head 41 includes first parallel plate 17. Laser beam LB is incident on first parallel plate 17. First parallel plate 17 rotates around first rotary axis a1, while maintaining a predetermined tilt angle with respect to first rotary axis a1 that is parallel to optical axis direction LD which is a passing direction of laser beam LB irradiating machining target 46.

Further, laser machining head 41 includes second parallel plate 19. Laser beam LB is incident on second parallel plate 19. Second parallel plate 19 rotates around second rotary axis a2, while maintaining the same tilt angle as first parallel plate 17 with respect to second rotary axis a2 that is parallel to optical axis direction LD which is a passing direction of laser beam LB irradiating machining target 46.

Laser machining head 41 further includes two motors (first servomotor 14 and second servomotor 21). First servomotor 14 rotates first parallel plate 17, and second servomotor 21 rotates second parallel plate 19. First servomotor 14 and second servomotor 21 respectively rotate first parallel plate 17 and second parallel plate 19 independently from each other.

Laser beam LB shifts in parallel by an amount determined by a thickness of first parallel plate 17, a thickness of second parallel plate 19, and a tilt angle of laser beam LB relative to an optical axis direction LD. Laser beam LB traces various paths on a two-dimensional irradiation plane by rotating first parallel plate 17 and second parallel plate 19.

A laser machining system and a laser machining head according to the present exemplary embodiment will be described below with reference to FIGS. 1 to 9.

Figure 3:
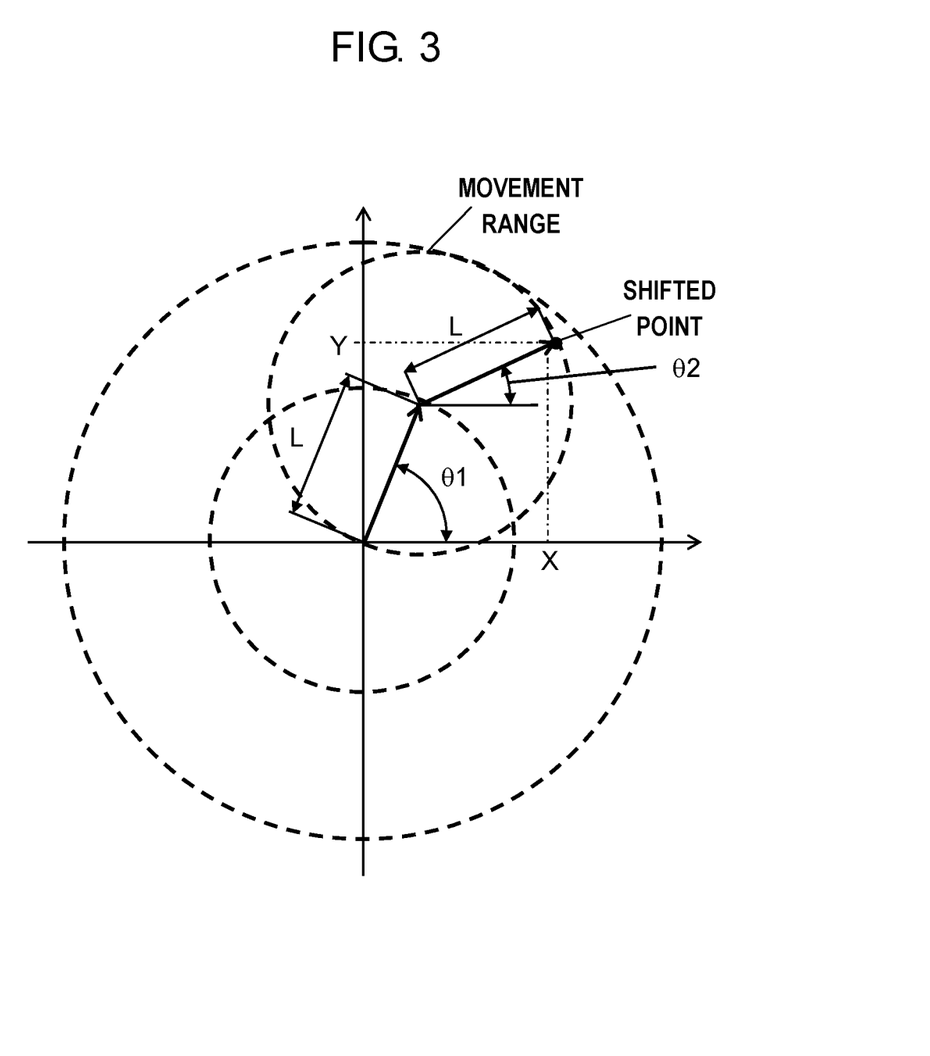
FIG. 3 illustrates an irradiation position of a laser beam according to the exemplary embodiment.
Figure 4:
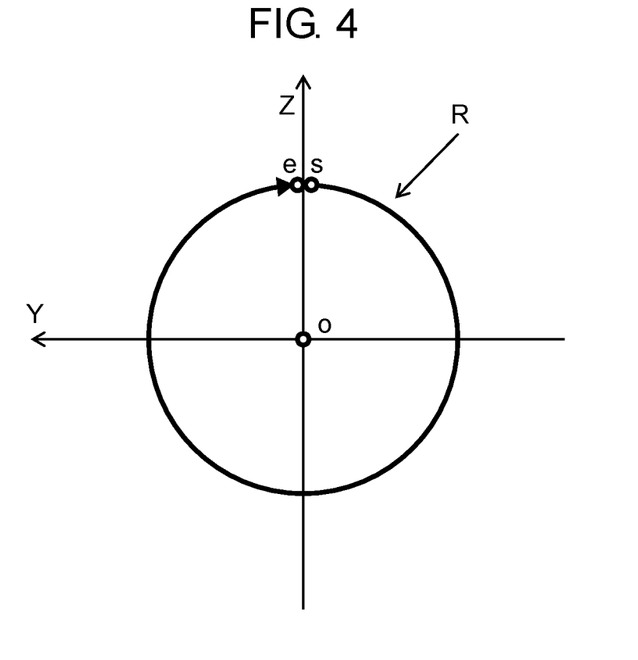
FIG. 4 shows an irradiation condition of a circular laser beam according to the exemplary embodiment.
Figure 5:
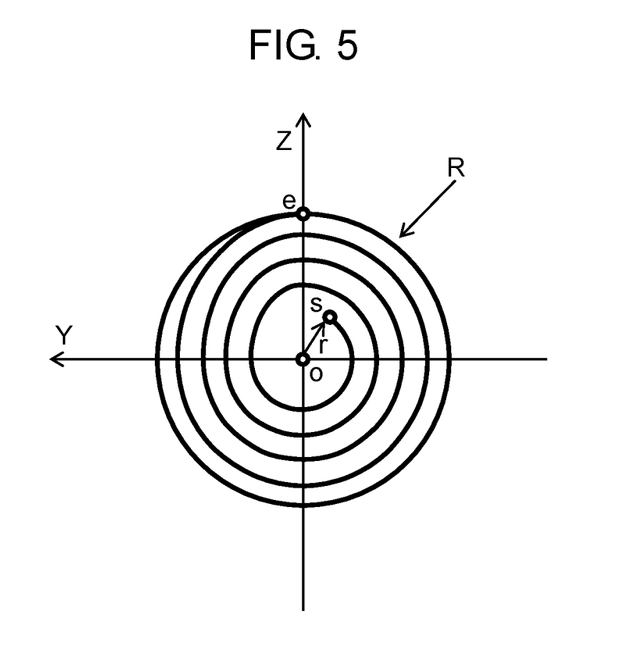
FIG. 5 shows an irradiation condition of a spiral laser beam according to the exemplary embodiment.
Figure 7:
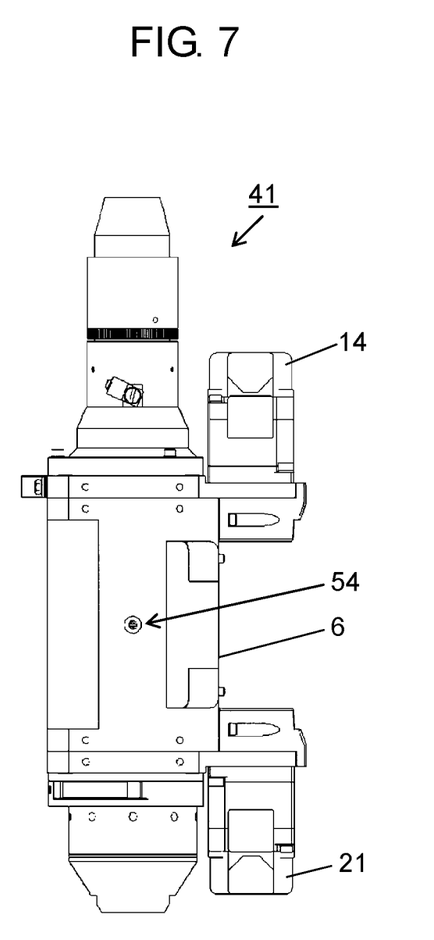
FIG. 7 shows an origin adjusting hole in a body casing according to the exemplary embodiment.
Figure 8:
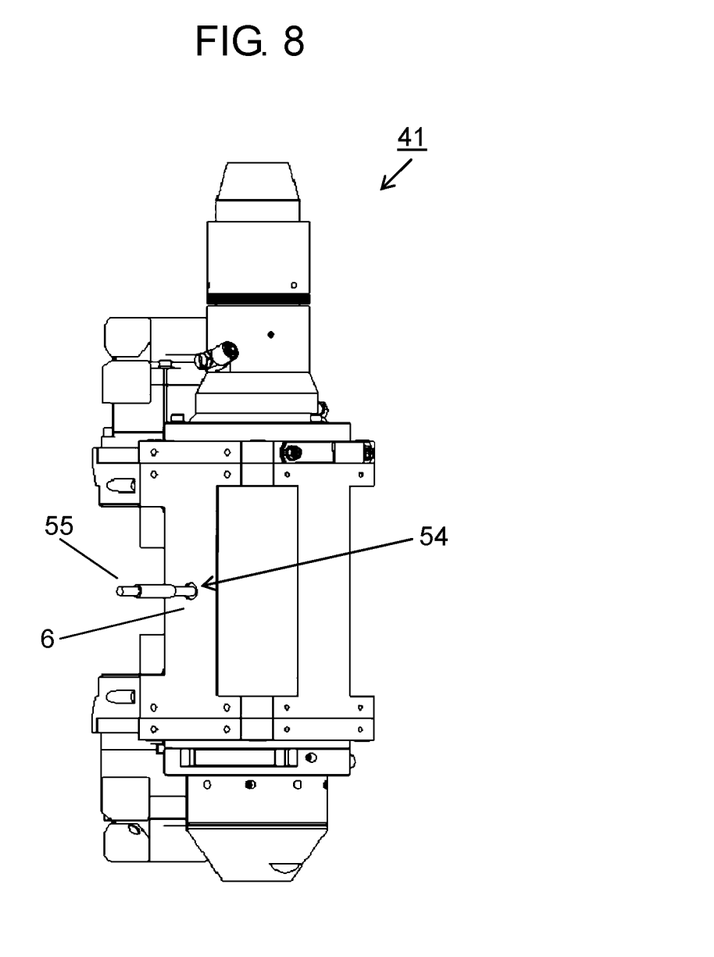
FIG. 8 shows a state in which an origin adjusting jig is set according to the exemplary embodiment.
Figure 9:
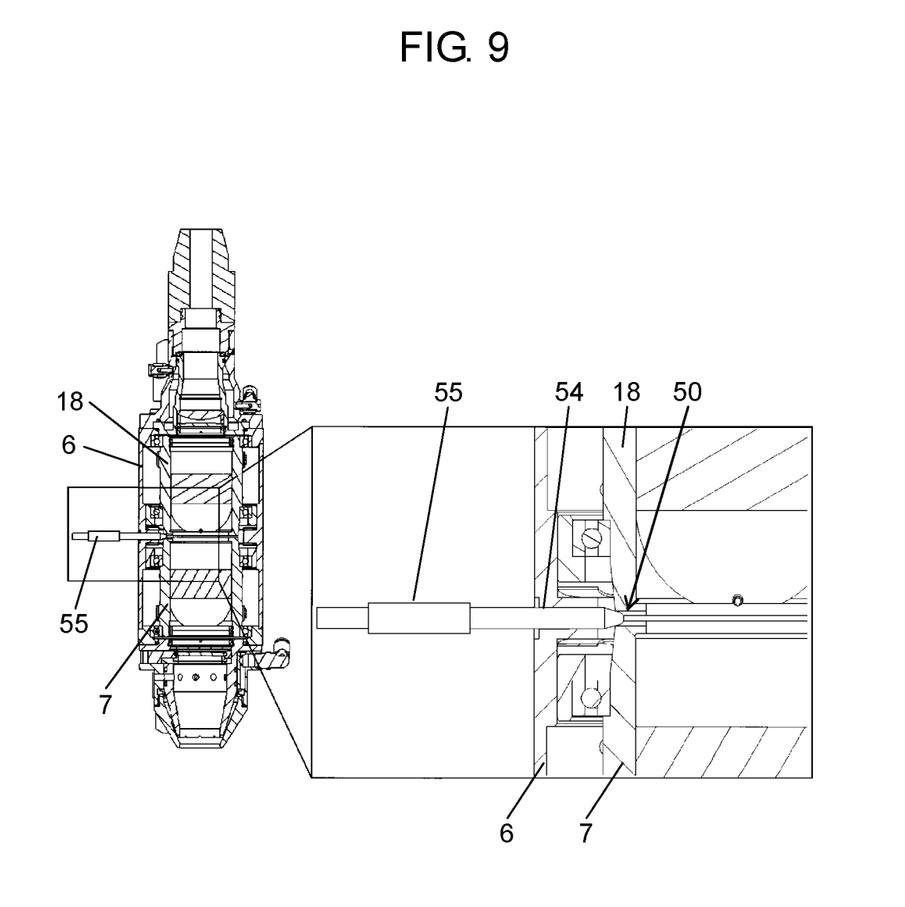
FIG. 9 illustrates origin calibration using the origin adjusting jig according to the exemplary embodiment.

FIG. 1 shows a schematic configuration of the laser machining system. FIG. 2 shows a schematic configuration of the laser machining head. FIG. 3 illustrates an irradiation position of a laser beam. FIG. 4 shows an irradiation condition of a circular laser beam. FIG. 5 shows an irradiation condition of a spiral laser beam. FIGS. 6A to 6D each illustrate a rotation angle identification unit provided on a holder. FIG. 7 shows an origin adjusting hole in a body casing. FIG. 8 is an external view of setting an adjusting jig and adjusting an origin. FIG. 9 is a sectional view and an enlarged view of FIG. 8.

The laser machining system will be described first with reference to FIG. 1. With reference to FIG. 1, laser machining system according to the present disclosure includes laser machining head 41, manipulator 42, robot control device 43, and laser oscillator 44.

Laser machining head 41 is attached to a tip end of manipulator 42, and manipulator 42 moves laser machining head 41. Robot control device 43 controls movements of both manipulator 42 and laser machining head 41. Laser oscillator 44 outputs laser beam LB. Laser beam LB output from laser oscillator 44 is guided to laser machining head 41 by optical fiber 45. The laser machining system according to the present disclosure performs machining of machining target 46 by irradiating machining target 46 with laser beam LB which is to be output from laser machining head 41. Robot control device 43 also controls an output of laser oscillator 44.

Then, laser machining head 41 will be described in detail with reference to FIG. 2. Laser machining head 41 includes connector 12. Laser machining head 41 is connected to optical fiber 45 (see FIG. 1) through connector 12.

Laser machining head 41 includes collimation lens 4 and focusing lens 5. Laser beam LB output from optical fiber 45 spreads out in a certain extent. Laser beam LB is then corrected to collimated light by collimation lens 4. Laser beam LB corrected to collimated light is condensed on a machining point by focusing lens 5.

Laser machining head 41 includes lens holder 3 to which collimation lens 4 and focusing lens 5 are fixed, and lens body 1 holding lens holder 3. Collimation lens 4 and focusing lens 5 are fixed to lens holder 3.

Laser machining head 41 includes first servomotor 14, first timing belt 15, first pulley 16, first parallel plate 17, and first holder 18. A first optical unit is formed of first servomotor 14, first timing belt 15, first pulley 16, first parallel plate 17, and first holder 18. First parallel plate 17 is fixed in first holder 18 having a cylindrical shape, both ends of which are held by bearings.

A parallel pin (not shown) is provided between first parallel plate 17 and first holder 18 to fix a relative position between first parallel plate 17 and first holder 18. Outer peripheral surface of first holder 18 includes first pulley 16 and first timing belt 15. First servomotor 14 rotates first parallel plate 17 fixed to first holder 18 through first pulley 16 and first timing belt 15.

Laser machining head 41 further includes shield holder 8, lever 9, nozzle holder 10, inner nozzle 11, connector 12, first member 23, second member 24, first protective glass 25, and second protective glass 26.

Specifically, first parallel plate 17 rotates around first rotary axis a1 extending in the same direction as optical axis direction LD of laser beam LB to be output from laser machining head 41. First servomotor 14 is a brushless DC servomotor (AC servomotor) with a serial encoder of 50 W, for example. According to the present exemplary embodiment, first servomotor 14 is the same kind as a servomotor (not shown) employed as manipulator 42 but is different from the servomotor in the output capacities.

Laser machining head 41 includes second servomotor 21, second timing belt 22, second pulley 20, second parallel plate 19, and second holder 7. A second optical unit is formed of second servomotor 21, second timing belt 22, second pulley 20, second parallel plate 19, and second holder 7. Second parallel plate 19 is fixed in second holder 7 having a cylindrical shape, both ends of which are held by bearings.

A parallel pin (not shown) is provided between second parallel plate 19 and second holder 7 to fix a relative position between second parallel plate 19 and second holder 7. Outer peripheral surface of second holder 7 includes second pulley 20 and second timing belt 22. Second servomotor 21 rotates second parallel plate 19 fixed to second holder 7 through second pulley 20 and second timing belt 22.

Specifically, second parallel plate 19 rotates around second rotary axis a2 extending in the same direction as optical axis direction LD of laser beam LB to be output from laser machining head 41.

As described above, the first optical unit and the second optical unit have the same configuration, and each component thereof is the same. With this configuration, two optical units (first optical unit and second optical unit) have the same response balance, thereby having an advantage of being easily controlled. First rotary axis a1 of the first optical unit and second rotary axis a2 of the second optical unit extend in the same direction. In addition, the first optical unit and the second optical unit are arranged symmetrically about the center of body casing 6. In other words, the first optical unit and the second optical unit are arranged symmetrically about a plane perpendicular to first rotary axis a1. For example, in FIG. 2, the first optical unit and the second optical unit are arranged symmetrically in the vertical direction.

In the layout shown in FIG. 2, a rotation direction of first parallel plate 17 becomes opposite to a rotation direction of second parallel plate 19, when first servomotor 14 and second servomotor 21 rotate in the same direction. Accordingly, first servomotor 14 that drives first parallel plate 17 is controlled to rotate in the direction opposite to the rotation direction of second servomotor 21.

It is desirable that first rotary axis a1 and second rotary axis a2 extend not only in the same direction but are disposed on the same line in the first optical unit and the second optical unit so as to downsize laser machining head 41 and increase an irradiation range of laser machining head 41.

Laser beam LB having passed through focusing lens 5 is refracted twice when passing through first parallel plate 17. Laser beam LB shifts in parallel by an amount determined by a thickness of first parallel plate 17, a tilt angle of first parallel plate 17 with respect to first rotary axis a1, and a refractive index of first parallel plate 17. Each of first parallel plate 17 and second parallel plate 19 according to the present exemplary embodiment is made of synthetic quartz of which thickness t is 13 mm, tilt angle with respect to the first rotary axis (or the second rotary axis) is 45°, and refractive index is 1.44963. Accordingly, laser beam LB having passed through first parallel plate 17 shifts by 4.1 mm. Thereafter, the laser beam also shifts by 4.1 mm when passing through second parallel plate 19. Therefore, a working range of laser beam LB according to the present exemplary embodiment is in a circle with a diameter of 16.4 mm.

An irradiation position of the laser beam having passed through first parallel plate 17 and second parallel plate 19 can be represented by two vectors each having a fixed magnitude and freely variable direction, as shown in FIG. 3. Therefore, the irradiation position of the laser beam on machining target 46 can be represented by the following equations.

$$X = L \cos \theta_1 + L \cos \theta_2$$

$$Y = L \sin \theta_1 + L \sin \theta_2$$

L: shift amount when the laser beam passes through one parallel plate $\theta_1$: rotation angle of first parallel plate 17

$\theta_2$: rotation angle of second parallel plate 19

Rotation angle $\theta_1$ of first parallel plate 17 and rotation angle $\theta_2$ of second parallel plate 19 are independently controlled by respective servomotors. Accordingly, laser beam LB can draw any figure within a movable range of laser beam LB. In particular, a figure such as a circle can be drawn smoothly by rotating a single servomotor or by continuously rotating two servomotors in the same direction at the same speed without a reverse operation of the servomotors.

In an actual operation, all patterns, which are welding patterns often used in remote welding such as a circle shown in FIG. 4 and a spiral shown in FIG. 5, can be drawn without a reverse operation of the motors. In other words, rotation of first rotary axis a1 and second rotary axis a2 in the same direction enables laser beam LB to draw a circular arc-shape, a circular shape, or a spiral shape on machining target 46 (see FIG. 1) without a reverse operation of first rotary axis a1 and second rotary axis a2.

A phase difference of rotation angles between first rotary axis a1 and second rotary axis a2 determines a radius of a range capable of being irradiated with laser beam LB.

As described above, laser machining head 41 according to the present exemplary embodiment utilizes characteristics of laser beam LB to be shifted when passing through first parallel plate 17 and second parallel plate 19 made of a light transmissive glass or the like, and two plates of first parallel plate 17 and second parallel plate 19 are continuously arranged inside laser machining head 41 in optical axis direction LD of laser beam LB. The rotation of first parallel plate 17 and second parallel plate 19 are independently controlled by respective servomotors (first servomotor 14 and second servomotor 21) to control a shift direction and a shift amount of laser beam LB. In this manner, accuracy of rotation angles of first parallel plate 17 and second parallel plate 19 greatly affects a shift direction and a shift amount of laser beam LB. Accordingly, it is obvious that the accuracy of the rotation angles also greatly affects laser machining.

For example, in case of a malfunction in a battery of a motor (first servomotor 14 or second servomotor 21) for storing angle data such as an origin position, a harness connecting the motor (first servomotor 14 or second servomotor 21) and the battery, or the motor itself (first servomotor 14 or second servomotor 21), an error occurs in the rotation angle of first parallel plate 17 or second parallel plate 19. Such an error must be calibrated.

The following description is directed to one example of a method of adjusting the rotation angles of first parallel plate 17 and second parallel plate 19 according to the present disclosure.

The present disclosure relates to laser machining head 41 configured to control an irradiation position of laser beam LB by rotating first parallel plate 17 and second parallel plate 19 in relation to each other. A rotation angle identification unit is provided on first holder 18 including first parallel plate 17 to identify the rotation angle of first parallel plate 17.

The rotation angle identification unit is provided at a fixed angle from the origin of first parallel plate 17 (at a fixed distance on the outer periphery of first holder 18) as viewed from the rotary axis, and thus a position of the origin of first parallel plate 17 to be stored in first holder 18 can be specified when a position of the rotation angle identification unit is specified. The origin of first parallel plate 17 indicates the tilting direction of first parallel plate 17 provided in a tilting manner with respect to first holder 18 and exists on the outer periphery of first holder 18. The origin of first parallel plate 17 and the rotation angle identification unit may coincide with each other.

The detailed configuration of the rotation angle identification unit will be described later with reference to FIGS. 6A to 6D.

In the same manner as first holder 18, a rotation angle identification unit is provided on second holder 7 including second parallel plate 19 to identify the rotation angle of second parallel plate 19. The rotation angle identification unit is provided at a fixed angle from the origin of second parallel plate 19 (at a fixed distance on the outer periphery of second holder 7) as viewed from the rotary axis, and thus a position of the origin of the second parallel plate 19 to be stored in second holder 7 can be specified when a position of the rotation angle identification unit is specified. The origin of second parallel plate 19 indicates the tilting direction of second parallel plate 19 provided in a tilting manner with respect to second holder 7 and exists on the outer periphery of second holder 7. The origin of second parallel plate 19 and the rotation angle identification unit may coincide with each other.

The rotation angle identification units provided respectively on first holder 18 and second holder 7 are independently (or mutually adjusted) positioned relative to each other, thereby facilitating calibration of the relative positions of the origins of first parallel plate 17 and second parallel plate 19.

The rotation angle identification units of first holder 18 and second holder 7 may have different shapes, but preferably have the same shape.

[Configuration of Rotation Angle Identification Unit]

Then, the rotation angle identification unit configured to identify an angle on first holder 18 or second holder 7 will be described with reference to FIGS. 6A to 6D.

The rotation angle identification unit is positioned in contact with origin adjusting jig 55 (see FIGS. 8 and 9), and thus is configured to have a surface (contact surface) to adaptively come in contact with origin adjusting jig 55. In rotation angle identification unit 50 shown in FIG. 6A, a cut-out portion includes a contact surface, in rotation angle identification units 51 and 52 respectively shown in FIGS. 6B and 6C, holes respectively include contact surfaces, and in rotation angle identification unit 53 shown in FIG. 6D, a projection includes a contact surface.

Figure 6A:
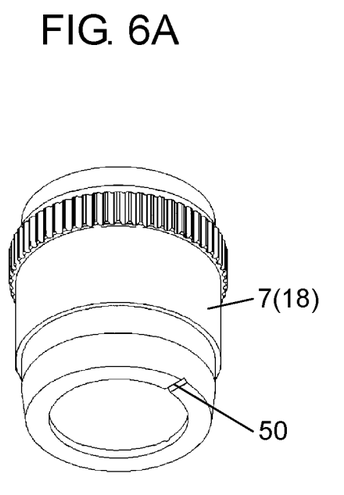
FIG. 6A shows an example of a rotation angle identification unit of a holder according to the exemplary embodiment.
Figure 6B:
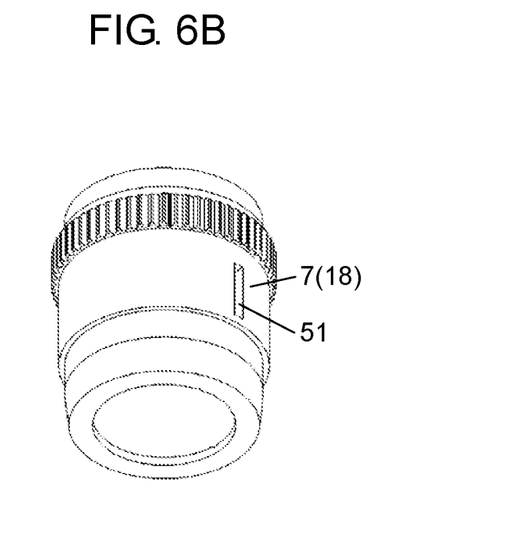
FIG. 6B shows an example of a rotation angle identification unit of a holder according to the exemplary embodiment.
Figure 6C:
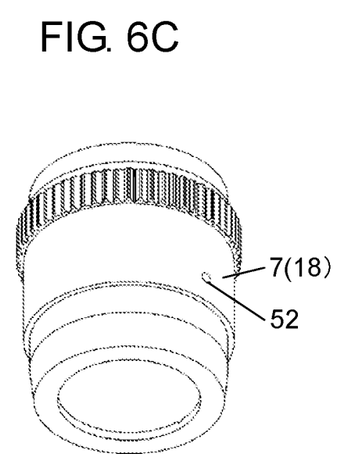
FIG. 6C shows an example of a rotation angle identification unit of a holder according to the exemplary embodiment.
Figure 6D:
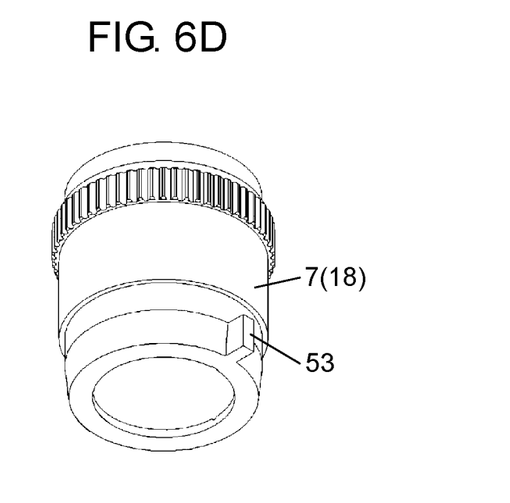
FIG. 6D shows an example of a rotation angle identification unit of a holder according to the exemplary embodiment.

Here, rotation angle identification unit 50 shown in FIG. 6A has a shape of a round cut out or an angular (triangle, quadrangle, polygon, or the like) cut out, rotation angle identification unit 51 shown in FIG. 6B has a shape of an angular hole, rotation angle identification unit 52 shown in FIG. 6C has a shape of a round hole, and rotation angle identification unit 53 shown in FIG. 6D has a shape of an angular projection. Rotation angle identification unit 53 in FIG. 6D may have a shape of a round projection.

[Configuration of Laser Machining Head]

Then, a configuration of laser machining head 41 according to the present exemplary embodiment will be described with reference to FIGS. 7 and 8.

FIGS. 7 and 8 each show an external appearance of laser machining head 41. Body casing 6 is provided with origin adjusting hole 54 so that rotation angle identification units 50 to 53 of first holder 18 (see FIGS. 6A to 6D) and second holder 7 (see FIGS. 6A to 6D) housed inside laser machining head 41 can be adjusted by a jig or the like from the outside. Origin adjusting hole 54 may be provided at any part of body casing 6, but is preferably provided at a center part of body casing 6. To determine a relative position of origin adjusting jig 55 to be adapted to origin adjusting hole 54 (see FIG. 8), diameters of origin adjusting hole 54 and origin adjusting jig 55 have the same shape and the same size, for example. The sizes of the diameters of origin adjusting hole 54 and origin adjusting jig 55 are determined such that origin adjusting jig 55 can be detachably inserted to origin adjusting hole 54 and origin adjusting jig 55 fits in origin adjusting hole 54. Body casing 6 may include a plurality of origin adjusting holes 54.

For example, to adjust the origins, first holder 18 and second holder 7 are adjusted by manual operation or the like so that a position of rotation angle identification unit 50 provided on each of first holder 18 and second holder 7 coincides with a position of origin adjusting hole 54 of body casing 6, and then as shown in FIG. 8, origin adjusting jig 55 is inserted through origin adjusting hole 54 of body casing 6 which is an outer wall of laser machining head 41.

FIG. 9 shows a sectional view and an enlarged view of a state in which origin adjusting jig 55 is inserted in body casing 6. As shown in FIG. 9, a surface of a cut-out portion of rotation angle identification unit 50 of first holder 18 and a surface of a cut-out portion of rotation angle identification unit 50 of second holder 7 are positioned by being pressed simultaneously by a tapered portion at a tip end of origin adjusting jig 55.

At the same time, origin adjusting jig 55 is also positioned with respect to body casing 6.

Although first holder 18 is provided with the cut-out portion of rotation angle identification unit 50 at a lower part of first holder 18 as shown in FIG. 6A, second holder 7 shown in FIG. 9 is provided with the cut-out portion of rotation angle identification unit 50 at an upper part of second holder 7, unlike the shape shown in FIG. 6A. With reference to FIG. 9, the cut-out portion of rotation angle identification unit 50 of first holder 18 corresponds to the cut-out portion of rotation angle identification unit 50 of second holder 7, and first holder 18 and second holder 7 are simultaneously positioned by a single origin adjusting jig 55.

With this configuration, body casing 6 which is the outer wall of laser machining head 41 includes origin adjusting hole 54 that enables simultaneous alignment of the positions of the surface of rotation angle identification unit of first holder 18 and the surface of the rotation angle identification unit of second holder 7 by inserting origin adjusting jig 55, and origin adjusting jig 55 is inserted from the outer wall of laser machining head 41 to simultaneously calibrate the origins of first parallel plate 17 and second parallel plate 19.

Accordingly, rotation angle identification unit 50 is positioned with respect to body casing 6, so that the origins of first parallel plate 17 and second parallel plate 19 are calibrated, and origin calibration of laser machining head 41 emitting a laser beam can be easily performed.

CONCLUSION

Laser machining head 41 according to the present disclosure controls an irradiation position of laser beam LB on machining target 46, as shown in FIG. 1 or 2. Laser machining head 41 includes: first parallel plate 17 configured to shift laser beam LB incident on first parallel plate 17; first holder 18 holding first parallel plate 17 and having a first rotation angle identification unit (for example, rotation angle identification unit 50 or the like); first servomotor 14 configured to rotate first holder 18 around first rotary axis a1; second parallel plate 19 configured to shift laser beam LB that has been shifted by first parallel plate 17; second holder 7 holding second parallel plate 19 and having second rotation angle identification unit (for example, rotation angle identification unit 50 or the like); and second servomotor 21 configured to rotate second holder 7 around second rotary axis a2. First parallel plate 17 and second parallel plate 19 are disposed such that first rotary axis a1 and second rotary axis a2 extend in an identical direction. In laser machining head 41, first servomotor 14 rotates first parallel plate 17 and second servomotor 21 rotates second parallel plate 19 to control an irradiation position of laser beam LB on machining target 46. The first rotation angle identification unit (rotation angle identification unit 50 or the like) has a positioning surface that allows positioning relative to first parallel plate 17, and the second rotation angle identification unit has a positioning surface that allows positioning relative to second parallel plate 19.

Further, according to the present disclosure, origin adjusting hole 54 is formed on an outer wall of laser machining head 41, as shown in FIG. 8 or the like. The positioning surface of the rotation angle identification unit (rotation angle identification unit 50 or the like) of first holder 18 and the positioning surface of the rotation angle identification unit (rotation angle identification unit 50 or the like) of second holder 7 are simultaneously aligned by inserting origin adjusting jig 55 in origin adjusting hole 54.

In an origin calibration method for laser machining head 41 according to the present disclosure, origin adjusting jig 55 is inserted from the outer wall of laser machining head 41, and an origin of first parallel plate 17 and an origin of second parallel plate 19 are calibrated simultaneously.

INDUSTRIAL APPLICABILITY

The present disclosure relates to a laser machining head configured to control an irradiation position of a laser beam by rotating a first parallel plate and a second parallel plate in relation to each other. A rotation angle identification unit is provided on each of a first holder including the first parallel plate and a second holder including the second parallel plate.

With this configuration, origins of the first parallel plate and the second parallel plate can be relatively calibrated, and origin calibration of the laser machining head can be easily performed. Accordingly, the present disclosure is industrially useful as a laser machining head usable for remote laser machining, in which machining such as welding is performed by emitting a laser beam from a position away from a machining point, and an origin calibration method for the laser machining head.

REFERENCE MARKS IN THE DRAWINGS

1: lens body
3: lens holder
4: collimation lens
5: focusing lens
6: body casing
7: second holder
8: shield holder
9: lever
11: inner nozzle
12: connector
14: first servomotor
15: first timing belt
16: first pulley
17: first parallel plate
19: second parallel plate
20: second pulley
21: second servomotor
22: second timing belt
23: first member
24: second member
25: first protective glass
26: second protective glass
41: laser machining head
42: manipulator
43: robot control device
44: laser oscillator
45: optical fiber
46: machining target
50, 51, 52, 53: rotation angle identification unit
54: origin adjusting hole
55: origin adjusting jig
a1, a2: rotary axis
t: thickness
L2: detection laser beam
LB: laser beam
LD: optical axis direction

The invention claimed is:

1. A laser machining head configured to control an irradiation position of a laser beam on a machining target, the laser machining head comprising:
a first parallel plate configured to shift the laser beam incident on the first parallel plate;
a first holder holding the first parallel plate and having a first rotation angle identification unit;
a first motor configured to rotate the first holder around a first rotary axis;
a second parallel plate configured to shift the laser beam that has been shifted by the first parallel plate;
a second holder holding the second parallel plate and having a second rotation angle identification unit; and
a second motor configured to rotate the second holder around a second rotary axis,
wherein the first parallel plate and the second parallel plate are disposed such that the first rotary axis and the second rotary axis extend in an identical direction,
the first motor rotates the first parallel plate and the second motor rotates the second parallel plate to control an irradiation position of the laser beam on the machining target,
the first rotation angle identification unit has a positioning surface that allows positioning relative to the first parallel plate, and
the second rotation angle identification unit has a positioning surface that allows positioning relative to the second parallel plate.

2. The laser machining head according to claim 1, wherein an origin adjusting hole is formed on an outer wall of the laser machining head, and
a positioning surface of a rotation angle identification unit of the first holder and a positioning surface of a rotation angle identification unit of the second holder are simultaneously aligned by inserting an origin adjusting jig in the origin adjusting hole.

3. The laser machining head according to claim 1, wherein the first rotary axis and the second rotary axis are co-linearly aligned with each other.

4. An origin calibration method for the laser machining head according to claim 1, wherein an origin adjusting hole is formed on an outer wall of the laser machining head, a positioning surface of a rotation angle identification unit of the first holder and a positioning surface of a rotation angle identification unit of the second holder are simultaneously aligned by inserting an origin adjusting jig in the origin adjusting hole, the method comprising:

inserting the origin adjusting jig from the outer wall of the laser machining head; and simultaneously calibrating an origin of the first parallel plate and an origin of the second parallel plate.

\* \* \* \* \*